(12) United States Patent
Müller-Hellwig et al.

(10) Patent No.: US 11,156,139 B2
(45) Date of Patent: Oct. 26, 2021

(54) METHOD AND DEVICE FOR PURIFYING EXHAUST GAS

(71) Applicant: AUDI AG, Ingolstadt (DE)

(72) Inventors: Simone Müller-Hellwig, Ingolstadt (DE); Roland Heigl, Eitensheim (DE); Alexander Krajete, Pasching (AT); Arne Seifert, Vienna (AT); Hagen Seifert, Regensburg (DE)

(73) Assignee: AUDI AG, Ingolstadt (DE)

( * ) Notice: Subject to any disclaimer, the term of this patent is extended or adjusted under 35 U.S.C. 154(b) by 218 days.

(21) Appl. No.: 16/339,129

(22) PCT Filed: Sep. 13, 2017

(86) PCT No.: PCT/EP2017/072962
§ 371 (c)(1),
(2) Date: Apr. 3, 2019

(87) PCT Pub. No.: WO2018/065179
PCT Pub. Date: Apr. 12, 2018

(65) Prior Publication Data
US 2019/0292960 A1    Sep. 26, 2019

(30) Foreign Application Priority Data
Oct. 5, 2016 (DE) .................. 10 2016 219 301.5

(51) Int. Cl.
*F01N 3/08* (2006.01)
*B01D 53/04* (2006.01)
*B01D 53/053* (2006.01)

(52) U.S. Cl.
CPC ....... *F01N 3/0857* (2013.01); *B01D 53/0415* (2013.01); *B01D 53/0462* (2013.01);
(Continued)

(58) Field of Classification Search
CPC ............. F01N 2240/26; F01N 2410/12; F01N 2570/10; F01N 3/0821; F01N 3/0857;
(Continued)

(56) References Cited

U.S. PATENT DOCUMENTS 9,435,239 B2 * 9/2016 Hyde ................... F01N 3/0857
9,708,947 B2 * 7/2017 Hyde ................... F02M 21/02
(Continued)

FOREIGN PATENT DOCUMENTS

EP    2472077 A1    7/2012
EP    2665544 A1    11/2013
(Continued)

OTHER PUBLICATIONS

Office Action dated Aug. 4, 2020, in connection with corresponding Chinese Application No. 201780061752.0; 8 pgs.
(Continued)

*Primary Examiner* — Anthony Ayala Delgado
(74) *Attorney, Agent, or Firm* — Maier & Maier, PLLC

(57) ABSTRACT

A method for purifying the exhaust gas generated by an internal combustion engine, wherein the exhaust gas generated by the internal combustion engine is conducted through an exhaust gas path in which at least one adsorption element is arranged, to which pollutants contained in the exhaust gas at least partly bind, and in which the at least one adsorption element is regenerated by at least partial desorption of the bound pollutants, and pollutants desorbed from the at least one adsorption element during the desorption process are stored in at least one storage unit.

17 Claims, 1 Drawing Sheet

(52) U.S. Cl.
CPC ......... *B01D 53/053* (2013.01); *F01N 3/0821* (2013.01); *F01N 3/0885* (2013.01); *B01D 2253/104* (2013.01); *B01D 2253/106* (2013.01); *B01D 2253/1124* (2013.01); *B01D 2257/504* (2013.01); *B01D 2258/012* (2013.01); *B01D 2258/014* (2013.01); *B01D 2259/4009* (2013.01); *B01D 2259/40056* (2013.01); *B01D 2259/4566* (2013.01); *F01N 2240/26* (2013.01); *F01N 2410/12* (2013.01); *F01N 2570/10* (2013.01); *Y02T 10/12* (2013.01)

(58) Field of Classification Search
CPC ............ F01N 3/0885; B01D 2253/104; B01D 2253/106; B01D 2253/1124; B01D 2257/504; B01D 2258/012; B01D 2258/014; B01D 2259/40056; B01D 2259/4009; B01D 2259/4566; B01D 53/0415; B01D 53/0462; B01D 53/053
See application file for complete search history.

(56) References Cited

U.S. PATENT DOCUMENTS

| | | | | |
|---|---|---|---|---|
| 9,802,152 | B2* | 10/2017 | Westendorf | B01D 53/78 |
| 2004/0144251 | A1 | 7/2004 | Hisateru | |
| 2005/0086932 | A1* | 4/2005 | Cheong | F01N 3/027 |
| | | | | 60/295 |
| 2008/0006155 | A1* | 1/2008 | Sellers | B01D 46/0065 |
| | | | | 95/282 |
| 2009/0013674 | A1* | 1/2009 | Ono | F01N 3/2033 |
| | | | | 60/311 |
| 2009/0214407 | A1* | 8/2009 | Reyes | B01J 20/226 |
| | | | | 423/230 |
| 2010/0284866 | A1* | 11/2010 | Jang | F01N 3/04 |
| | | | | 422/170 |
| 2011/0185705 | A1 | 8/2011 | Shaw et al. | |
| 2013/0220130 | A1* | 8/2013 | Ihms | F01N 3/0857 |
| | | | | 96/329 |
| 2013/0298532 | A1* | 11/2013 | Hamad | B01D 53/92 |
| | | | | 60/274 |
| 2014/0099245 | A1* | 4/2014 | Hamad | B01D 53/62 |
| | | | | 423/212 |
| 2015/0033711 | A1 | 2/2015 | Hyde et al. | |
| 2015/0125368 | A1 | 5/2015 | Belchior et al. | |

FOREIGN PATENT DOCUMENTS

| | | |
|---|---|---|
| EP | 2959956 A1 | 12/2015 |
| JP | 2006-226218 A | 8/2006 |
| JP | 2009-008053 A | 1/2009 |
| JP | 2010208435 A | 9/2010 |
| JP | 2011-179338 A | 9/2011 |
| JP | 2012-217959 A | 11/2012 |
| JP | 2014-504695 A | 2/2014 |
| JP | 2016-052631 A | 4/2016 |
| KR | 1020090095655 A | 9/2009 |
| KR | 10-1451541 B1 | 10/2014 |
| WO | 2012035361 A1 | 3/2012 |
| WO | 2012100149 A1 | 7/2012 |
| WO | 2012100165 A1 | 7/2012 |
| WO | 2013109895 A1 | 7/2013 |
| WO | 2018/057780 A1 | 3/2018 |

OTHER PUBLICATIONS

Examination Report dated Jun. 9, 2017 of corresponding German application No. 10 2016 219 301.5; 14 pages.

International Search Report and Written Opinion dated Jan. 8, 2018 of corresponding application No. PCT/EP2017/072962; 19 pages.

Korean Office Action dated Oct. 19, 2020, in connection with corresponding Korean Application No. 10-2019-7012715 (18 pp., including machine-generated English translation).

German Office Action dated Sep. 12, 2019, in connection with corresponding DE Application No. 10 2016 219 301.5 (13 pgs., including machine-generated English translation).

Korean Office Action dated Aug. 11, 2020, in connection with corresponding KR Application No. 10-2019-7012715 (13 pp., including machine-generated English translation).

International Preliminary Report on Patentability (Chapter 1) dated Apr. 18, 2019 of corresponding International application No. PCT/EP2017/072962; 7 pages.

Office Action dated Sep. 8, 2020 in corresponding Japanese Application No. 2019-518208; 16 pages including English-language translation.

Korean Office Action dated Dec. 30, 2020, in connection with corresponding Korean Application No. 10-2019-7012715 (14 pp., including machine-generated English translation).

* cited by examiner

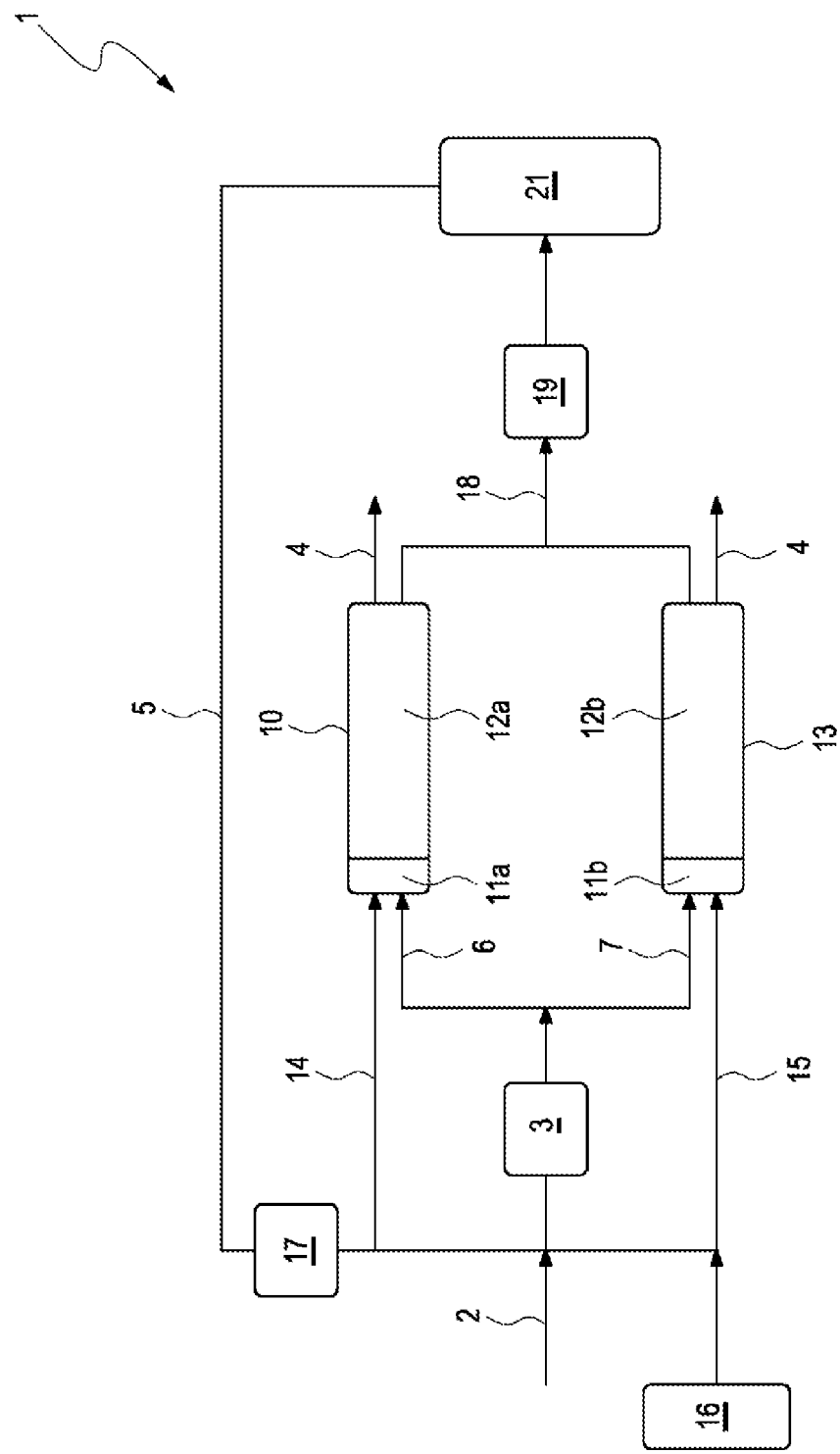

METHOD AND DEVICE FOR PURIFYING EXHAUST GAS

FIELD

The present disclosure relates to a method for purifying the exhaust gas generated by an internal combustion engine and an exhaust gas system for an internal combustion engine. Moreover, the present invention relates to a vehicle with an exhaust gas system configured to carry out the proposed method.

BACKGROUND

During the operation of internal combustion engines, exhaust gas is produced, which is laden with pollutants, such as carbon dioxide. Since such pollutants are harmful to the environment, ever stricter limit values are being imposed on the concentration of such pollutants in exhaust gases of internal combustion engines. Thus far, methods for exhaust gas after treatment to lower the concentration of pollutants emitted by an internal combustion engine have been based on an oxidation or reduction of the pollutants by means of catalysts.

In European patent EP 29 599 56 A1 a method is disclosed for the absorbing of carbon dioxide from a gas containing carbon dioxide.

The U.S. patent US 2015 0033 711 A discloses a vehicle with a carbon dioxide separating system, which is configured to store the separated carbon dioxide in a storage unit.

A cyclical process for the regeneration of absorbed gases and a regeneration of a ceramic absorption material is disclosed in the U.S. patent US 2015 012 53 68 A.

The international publication WO 2013 109 895 A1 discloses a method in which a heat exchange process of adsorbed carbon dioxide takes place with a hot exhaust gas stream generated by an internal combustion engine.

Given this background, one problem which the present invention proposes to solve is to provide a possibility for a low-pollution operation of an internal combustion engine.

SUMMARY

For the solution of the above mentioned problem, a method is proposed for purifying the exhaust gas generated by an internal combustion engine, wherein the exhaust gas generated by the internal combustion engine is conducted through an exhaust gas path in which at least one adsorption element is arranged, to which pollutants contained in the exhaust gas at least partly bind, and in which the at least one adsorption element is regenerated by at least partial desorption of the bound pollutants, and pollutants desorbed from the at least one adsorption element during the desorption process are stored in at least one storage unit.

The proposed method serves in particular for the purifying of exhaust gas generated by an internal combustion engine, such as a Diesel, gasoline, or gas engine. For this, it is proposed according to the invention that pollutants contained in the exhaust gas generated by the internal combustion engine, especially carbon dioxide, are at least partly adsorbed by means of at least one adsorption element. This means that pollutants contained in the exhaust gas are built up at least partly in an adsorption step on the at least one adsorption element and are stored there at least temporarily, i.e., for a limited period of time. After the period of time, the pollutants are desorbed from the at least one adsorption element in a desorption step and finally taken to a storage unit. The period of time for which the pollutants are stored on the at least one adsorption element may be chosen, e.g., in dependence on an adsorption capacity of the at least one adsorption element.

By an adsorption element is meant in the context of the present invention a device which is suited to extracting a substance, such as a pollutant, from an exhaust gas and accumulating it on its surface. Thanks to the use of an adsorption element, as compared to an absorption element, it is possible to desorb particles such as pollutants built up on an adsorption element more quickly and using less energy, i.e., more efficiently.

The method according to the invention is designed in particular in three stages, so that in a first stage pollutants contained in a respective exhaust gas are adsorbed or built up by the at least one adsorption element provided according to the invention and in a second stage the pollutants built up on the adsorption element are desorbed. For the desorption of the pollutants from the at least one adsorption element, i.e., for the releasing or separating of the pollutants from the at least one adsorption element, the adsorption element may be heated for example, and/or have an auxiliary gas flow through it. Once the pollutants have been desorbed from the at least one adsorption element and lie free, it is provided that in a third stage the desorbed pollutants are taken to a storage unit and are stored there. This means that pollutants contained in the exhaust gas are taken to a storage unit and build up there. The pollutants built up in the storage unit can be used as raw material for processes taking place in the internal combustion engine or they can be removed from the storage unit and taken for example to an external storage unit with respect to the internal combustion engine, in order to be finally supplied as raw material to a further use.

In one possible embodiment of the proposed method, it is proposed that the at least one adsorption element comprises an adsorption layer of a material from the following list of materials or a combination thereof: aluminum oxide or aluminum silicate.

It has proven to be advantageous for the at least one adsorption element provided according to the invention to be outfitted with an aluminum-based adsorption layer on which the respective pollutants are deposited. Adsorption layers of $Al_2O_3$ or aluminum silicate have proven to be especially advantageous for this.

In another possible embodiment of the proposed method, it is proposed that the at least one adsorption element is a solid adsorption element with an inorganic or organic matrix. It is further proposed that the pollutants are bound regeneratively to the at least one adsorption layer.

The at least one adsorption element provided according to the invention may be provided for example as a solid body in an exhaust gas system of a respective internal combustion engine. The adsorption element may have a support matrix, on which an adsorption layer is applied. It is conceivable for the adsorption element to be in honeycomb shape or any other form to maximize the surface of the adsorption element.

In order to achieve a desorption of pollutants built up on the at least one adsorption element according to the invention, and to transfer the pollutants built up on the adsorption element to a storage unit, it is proposed that the adsorption element, or an adsorption layer of the adsorption element, is configured to bind respective pollutants regeneratively, i.e., releasably or reversibly. For this, it may be provided in particular that the pollutants are built up on the adsorption element by physical forces, i.e., physisorptively, for example by an electrostatic interaction between the pollutants and the adsorption element.

In another possible embodiment of the proposed method, it is proposed that bound pollutants are regenerated by the at least one desorption element by means of a desorption process from the following list of desorption processes or a combination thereof: raising a temperature of the at least one adsorption element, raising a temperature in an environment of the at least one adsorption element, reduction of an atmospheric pressure in the environment of the at least one adsorption element, flow of an auxiliary gas through the at least one adsorption element.

In order to regenerate the at least one adsorption element according to the invention, i.e., to desorb pollutants built up on the at least one adsorption element or loosen them from the at least one adsorption element, it may be provided that the at least one adsorption element is subjected to a change in temperature and/or pressure. In particular, a heating of the at least one adsorption element may trigger interactions between respective pollutants and the at least one adsorption element, regardless of whether they are of a chemical or physical nature. Accordingly, a heating of the adsorption element favors a desorption of the pollutants from the adsorption element, so that the pollutants can be loosened from the at least one adsorption element and taken to a storage unit.

Furthermore, a desorption of the at least one adsorption element according to the invention is conceivable by means of an auxiliary gas, i.e., a gas which is conveyed from an auxiliary gas storage unit or from the surroundings of a corresponding exhaust gas system into or around the at least one adsorption element, and which takes up pollutants built up on the at least one adsorption element.

It has proven to be especially advantageous to combine a heating of the at least one adsorption element with a flow through by means of an auxiliary gas and/or a pressure reduction in the surroundings of the at least one adsorption element. By a combination of a heating of the at least one adsorption element with a flow through by means of an auxiliary gas, the pollutants which are easily loosened from the at least one adsorption element by the heating can be taken up by a corresponding auxiliary gas stream and be carried away by it. Pure carbon dioxide has proven to be especially suitable as auxiliary gas for the desorbing of carbon dioxide, since this no longer needs to be separated from the carbon dioxide that has been desorbed as a pollutant from the at least one adsorption element. Alternatively, the use of air as an auxiliary gas has also proven to be suitable.

In another possible embodiment of the proposed method, it is proposed that pollutants released during the desorption from the at least one adsorption element are conducted by means of a pressure generator to the at least one storage unit and build up in the at least one storage unit, generating pressure.

By the use of a pressure generator, such as a compressor or a fan, it is possible to generate a volume flow around the at least one adsorption element according to the invention and for this to flow together with respective desorbed pollutants to a storage unit. In addition, a further pressure generator can be arranged at the storage unit, which compresses the volume flow in the storage unit in the manner of a pressurized storage unit.

In another possible embodiment of the proposed method, it is proposed that a plurality of adsorption elements are used, and at a first moment of time in a cyclical operation pollutants contained in the exhaust gas are bound at least partly in a first portion of the plurality of adsorption elements and a second portion of the plurality of adsorption elements is regenerated. Furthermore, it is proposed that at a second moment of time pollutants contained in the exhaust gas are bound at least partly in the second portion of the plurality of adsorption elements and the first portion of the plurality of adsorption elements is regenerated.

In order to enable a continuous duty of the proposed method, it is provided in particular that a plurality of adsorption elements, especially two adsorption elements are used. Thanks to a plurality of adsorption elements it is possible to use individual adsorption elements of the plurality of adsorption elements at first in a sequential operation for the adsorption of pollutants and then subject them to a desorption process. It is provided that respective adsorption elements will be used in such a way that while a first adsorption element is being used for the adsorption of pollutants a further adsorption element is being subjected to a desorption process in a parallel process at the same time, and vice versa. Accordingly, at all times there is at least one adsorption element available with a capacity for adsorption and accumulation of pollutants depending on a predetermined time sequence of adsorption and desorption processes.

In another possible embodiment of the proposed method, it is proposed that minute particles in exhaust gas generated by the internal combustion engine are stored in at least one filter element arranged upstream and/or downstream from the at least one adsorption element in the flow direction of exhaust gas generated by the internal combustion engine.

In order to purify an exhaust gas stream generated by an internal combustion engine in such a way that its pollutant emission is within the limit values for minute particles in particular, such as nitrogen oxides, filter elements can be arranged in an exhaust gas path designed to carry out the proposed method that are suitable to taking up the minute particles. Such filter elements can be exchanged, e.g., during a servicing, and be emptied outside of the internal combustion engine and conditioned for further use.

In another possible embodiment of the proposed method, it is proposed that a temperature of the exhaust gas is adjusted at a suitable temperature for an adsorption of the pollutants by means of at least one cooling element and/or at least one heating element.

In order to make possible an especially efficient build-up of pollutants on the at least one adsorption element according to the invention, it is especially advantageous to adjust a temperature of the adsorption element or an environment of the adsorption element at which the adsorption element exhibits a strong interaction with the pollutants. For this, it may be provided, e.g., to cool the exhaust gas flowing against the adsorption element down to a temperature between 100° C. and 500° C., especially to around 100° C.

In another possible embodiment of the proposed method, it is proposed that pollutants stored in the storage unit are transferred from the at least one storage unit to a storage unit which is external to the internal combustion engine.

In order to regenerate a storage unit of an exhaust gas system configured to carry out the proposed method and prepare it accordingly to handle other pollutants, it may be provided that pollutants stored in the storage unit are transferred to an external storage unit, such as a pressurized storage unit. For this, a pressure generator may be arranged at the storage unit of the exhaust gas system or a vacuum generator can be used at the external storage unit in order to create a pressure gradient whereby the pollutants are distributed among the different storage units.

The proposed method serves in particular for the removal of carbon dioxide from an exhaust gas of an internal combustion engine. Of course, the proposed method is also suited to the adsorption and desorption of other pollutants, such as carbon monoxide, nitrogen monoxide, nitrogen dioxide or other nitrogen oxides.

Moreover, the proposed invention relates to an exhaust gas system for an internal combustion engine, having an exhaust gas path and at least one adsorption element arranged in the exhaust gas path, wherein the at least one adsorption element is configured to bind at least partly pollutants contained in the exhaust gas in an adsorption process, and in which the at least one adsorption element is configured to be regenerated by at least partial desorption of the bound pollutants. It is proposed that the exhaust gas system comprises at least one storage unit, in which pollutants desorbed from the at least one adsorption element during a desorption process are to be stored.

For example, it is possible by means of the exhaust gas system according to the invention to bind around 2 kg of carbon dioxide with two carbon dioxide adsorption elements each weighing 10 kg. It is assumed here that 1 kg of carbon dioxide is bound on 10 kg of adsorber mass, corresponding to a binding capacity of the carbon dioxide adsorption element of 10%. In a 10 liter carbon dioxide cylinder, accordingly, around 10 kg of carbon dioxide could be recovered after 5 cycles of respective adsorptions and desorption steps, corresponding to a 20% reduction in the carbon dioxide load of the internal combustion engine given an emission of 110 g of carbon dioxide per kilometer.

The proposed exhaust gas system serves in particular to carry out the proposed method. Moreover, the proposed invention relates to a vehicle configured to carry out the proposed method.

The proposed exhaust gas system serves in particular for the operation of the proposed vehicle.

Further benefits and embodiments will emerge from the specification and the enclosed drawing.

It is to be understood that the previously mentioned features and those yet to be explained below may be used not only in the particular indicated combination, but also in other combinations or standing alone, without leaving the scope of the present invention.

The invention is represented schematically with the aid of embodiments in the drawing and shall be described schematically and in detail with reference to the drawing.

BRIEF DESCRIPTION OF THE FIGURES

FIG. 1 shows one possible embodiment of the exhaust gas system according to the invention.

DETAILED DESCRIPTION

FIG. 1 represents an exhaust gas system 1 of an internal combustion engine. For the purifying of exhaust gas generated by the internal combustion engine, the exhaust gas in an exhaust gas mass flow, as indicated by arrow 2, is at first at least partly dehumidified by a radiator 3 and then divided into two exhaust gas streams, as indicated by arrows 6 and 7.

A first exhaust gas stream, as indicated by arrow 6, is conveyed to a first cartridge 10, comprising a first prefilter 11a and a first carbon dioxide adsorption element 12a. A second exhaust gas stream, indicated by arrow 7, is taken to a second cartridge 13, comprising a second prefilter 11b and a second carbon dioxide adsorption element 12b.

While the prefilters 11a and 11b take up components such as nitrogen oxides, hydrocarbons, and carbon monoxide, carbon dioxide contained in the exhaust gas is at least partly adsorbed by the carbon dioxide adsorption elements 12a and 12b. Accordingly, exhaust gas low in carbon dioxide leaves the cartridges 10 and 13, as indicated by arrows 4.

Once the capacity for taking up carbon dioxide by the first cartridge 10 is exhausted, which is the case for instance when an adsorbed pollutant mass corresponds to around 10% of the weight of the carbon dioxide adsorption element 12a, the original exhaust gas stream per arrow 2 is diverted, as indicated by arrow 14. At the same time, the first cartridge 10 is switched to a desorption mode, in which the carbon dioxide adsorption element 12a of the cartridge 10 is swept with an auxiliary gas, such as pure carbon dioxide from an auxiliary gas storage unit 16. The auxiliary gas is converted by a heat exchanger 17 to a high-temperature state and finally taken to the cartridge 10 which has been switched to the desorption mode. The heat exchanger may be supplied with hot exhaust gases from a storage unit, for example, in order to heat the auxiliary gas.

In the cartridge 10, the high-temperature auxiliary gas results in a desorption of pollutants built up on the carbon dioxide adsorption element 12a and it flows along with the desorbed pollutants, as indicated by arrow 18, across a compressor 19 to a storage unit 21.

After the carbon dioxide adsorption element 12a has been desorbed and the cartridge 10 has been regenerated accordingly, the exhaust gas stream per arrow 2 is once more diverted, as indicated by arrow 15, so that the cartridge 13 can be regenerated.

In another possible embodiment, the auxiliary gas flowed through whichever of the cartridges 10,13 undergoing desorption may be provided by or taken at least in part from the storage unit 21.

The invention claimed is:

1. A method for purifying exhaust gas generated by an internal combustion engine, comprising:
generating the exhaust gas by the internal combustion engine through an exhaust gas path in which at least one adsorption element is arranged, to which pollutants contained in the exhaust gas at least partly bind,
wherein the at least one adsorption element is regenerated by at least partial desorption of the bound pollutants,
wherein pollutants desorbed from the at least one adsorption element during a desorption process are stored in at least one storage unit, and
wherein pollutants bound by the at least one adsorption element are regenerated by means of the desorption process in which an auxiliary gas is flowed through the at least one adsorption element.

2. The method as claimed in claim 1, wherein the at least one adsorption element comprises:
an adsorption layer of a material from the following list of materials or a combination thereof: aluminum oxide or aluminum silicate.

3. The method as claimed in claim 2, wherein the at least one adsorption element is a solid adsorption element with an inorganic or organic matrix, and wherein the pollutants are bound regeneratively and/or physisorptively to the at least one adsorption layer.

4. The method as claimed in claim 1, wherein the desorption process additionally comprises at least one of:
raising a temperature of the at least one adsorption element; raising a temperature in an environment of the at least one adsorption element; and reduction of an atmospheric pressure in the environment of the at least one adsorption element.

5. The method as claimed in claim 1, wherein pure carbon dioxide and/or synthetic air prepared by means of an auxiliary gas storage unit is provided as the auxiliary gas.

6. The method as claimed in claim 1, wherein the auxiliary gas is taken at least in part from the at least one storage unit.

7. The method as claimed in claim 1, wherein pollutants released during the desorption from the at least one adsorption element are conducted by means of a pressure generator to the at least one storage unit and build up in the at least one storage unit, generating pressure.

8. The method as claimed in claim 1, wherein a plurality of adsorption elements is used, and wherein at a first moment of time in a cyclical operation pollutants contained in the exhaust gas are bound at least partly in a first portion of the plurality of adsorption elements and a second portion of the plurality of adsorption elements is regenerated, and at a second moment of time pollutants contained in the exhaust gas are bound at least partly in the second portion of the plurality of adsorption elements and the first portion of the plurality of adsorption elements is regenerated.

9. The method as claimed in claim 1, wherein minute particles in exhaust gas generated by the internal combustion engine are stored in at least one filter element arranged upstream and/or downstream from the at least one adsorption element in the flow direction of exhaust gas generated by the internal combustion engine.

10. The method as claimed in claim 9, wherein the at least one filter element is removed from the internal combustion engine and regenerated.

11. The method as claimed in claim 1, wherein a temperature of the exhaust gas is adjusted at a suitable temperature for an adsorption of the pollutants by means of at least one cooling element and/or at least one heating element.

12. The method as claimed in claim 1, wherein pollutants stored in the storage unit are transferred from the at least one storage unit to a storage unit which is external to the internal combustion engine.

13. The method as claimed in claim 1, wherein the pollutant is carbon dioxide.

14. An exhaust gas system for an internal combustion engine, comprising:
an exhaust gas path and at least one adsorption element arranged in the exhaust gas path, wherein the at least one adsorption element is configured to at least partly bind pollutants contained in the exhaust gas in an adsorption process,
wherein the at least one adsorption element is configured to be regenerated by at least partial desorption of the bound pollutants, and
wherein the exhaust gas system comprises at least one storage unit, which is designed to store pollutants desorbed from the at least one adsorption element during a desorption process, and
wherein, as part of the desorption process, an auxiliary gas is flowed through the at least one adsorption element.

15. The exhaust gas system of claim 14, wherein the desorption process additionally comprises at least one of:
raising a temperature of the at least one adsorption element; raising a temperature in an environment of the at least one adsorption element; and reduction of an atmospheric pressure in the environment of the at least one adsorption element.

16. The exhaust gas system of claim 14, wherein pure carbon dioxide and/or synthetic air prepared by means of an auxiliary gas storage unit is provided as the auxiliary gas.

17. The exhaust gas system of claim 14, wherein the auxiliary gas is taken at least in part from the at least one storage unit.

* * * * *